March 29, 1927.
J. O. BAILEY
1,622,483
MOUNTING FOR ANTIFRICTION BEARINGS
Filed Oct. 26, 1921
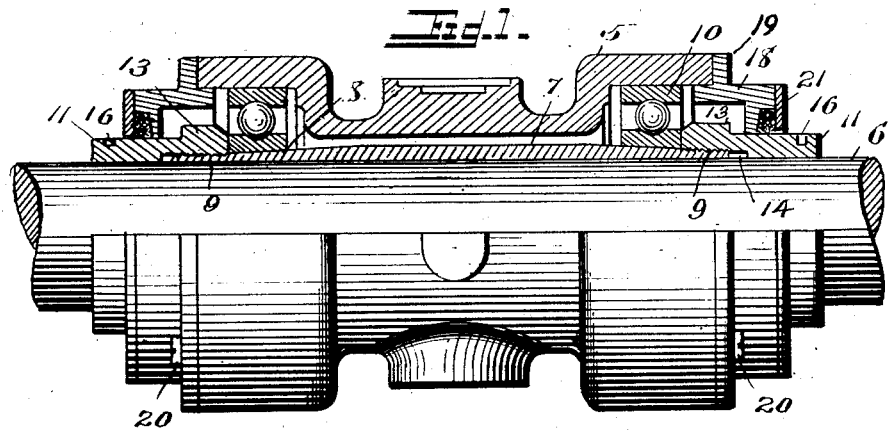
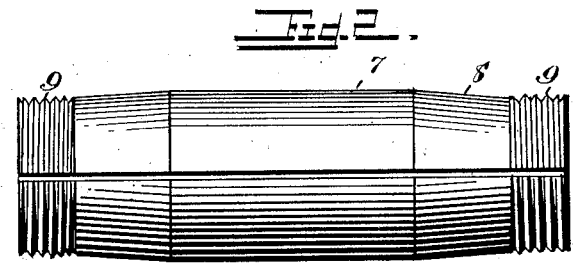
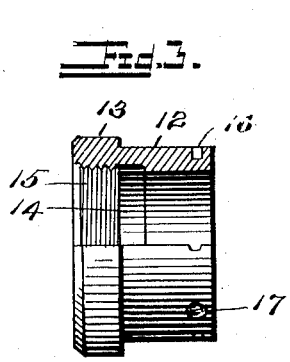
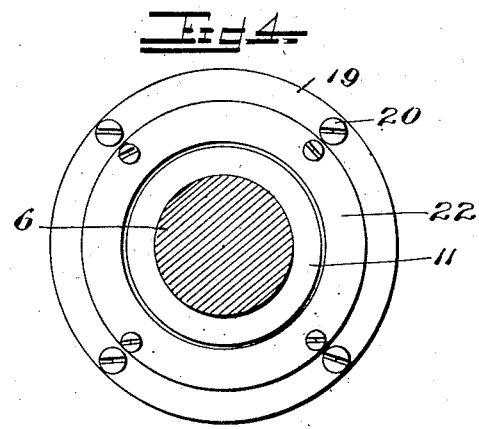
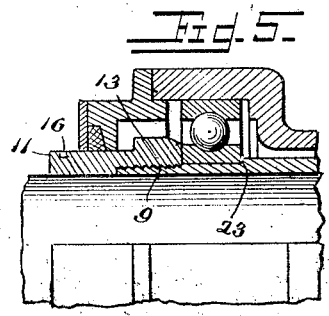

Patented Mar. 29, 1927.

1,622,483

UNITED STATES PATENT OFFICE.

JOSEPH OSWELL BAILEY, OF ATLANTA, GEORGIA.

MOUNTING FOR ANTIFRICTION BEARINGS.

Application filed October 26, 1921. Serial No. 510,519.

The present invention relates to mounting for antifriction shaft bearings.

Objects of the invention are: to provide a simplified type of hanger which is capable of expeditious application either in the replacement of hanger bearings now commonly used, or in the original association of a hanger bearing with a shaft; to provide relatively large bearings to thereby secure a maximum of power rating in excess of that obtained by the use of present structures of this nature; to provide a hanger in which the bearings may be adjusted without dismantling the housing or removing any parts of the latter; and to provide a hanger which houses the bearings from contact with injurious foreign materials gases, or excess atmospherical moisture, likewise preventing loss of lubricant when the bearings are adjusted.

With these and other objects in view, which will become apparent as the description proceeds, the invention resides in the construction, combination and arrangement of parts, hereinafter more fully described and claimed, and illustrated in the accompanying drawings, in which like characters of reference indicate like parts throughout the several figures, of which:

Fig. 1 is a side elevational view, partly in section, of a hanger bearing constructed in accordance with this invention, illustrating its application;

Fig. 2 is a side elevational view of the adapter sleeve constructed in accordance with this invention;

Fig. 3 is a side elevational view, partly in section, of an adapter nut constructed in accordance with this invention;

Fig. 4 is an end elevational view of the hanger showing a shaft mounted therein; and Fig. 5 is a sectional view of the inven- in a modified form.

In the drawings in order to illustrate the application of the invention a housing 5 is shown, which may be of the usual or any desired configuration and has arranged therein a shaft 6 This device is especially adapted for use in power transmission and may be associated with power shafts, immaterial of the use of the latter.

Mounted upon the shaft 6 is a split adapter sleeve 7, which is cylindrical in configuration and has the ends thereof tapered as indicated at 8, the outer terminals of the tapered portions being provided with external screw threads 9. The diameter of the bore of the sleeve is uniform throughout, consequently, in order to provide the taper as indicated at 8, the outer surface ends of the sleeve are diminished by milling or otherwise. The sleeve may be of any desired length, but preferably, as shown in Fig. 1 of the drawings, its length is slightly in excess of the length of the housing 5, so that the terminal threads of the sleeve will extend appreciably beyond the terminals of the housing.

Bearings generally designated 10 are slidably mounted upon the sleeve 7, one being arranged on each of the tapered portions 8 of the sleeve. Each bearing preferably consists of an inner and outer race between which ball bearings are interposed in a manner well known to the art. The inner peripheries of the inner races complement the outer peripheries of the sleeve 7, at the point of taper of the sleeves, to snugly embrace the latter. As shown in Fig. 1, the bearings 10 will clear the threads 9 of the adapter sleeve, and are arranged completely within the housing 5.

In order to maintain the bearings 10 in a predetermined position upon the sleeve 7, and in order to contact the latter into snug engagement with the shaft 6, adapter nuts 11 are provided, each of which, consists of a cylindrical cuff 12 one end of which is enlarged to provide an annular flange 13. The diameter of the bore at one end of said cuff is enlarged, as indicated at 14, and a portion of the enlarged bore at the outer end of the cuff, provided with internal screw threads 15. These threads engage the corresponding threads 9 on the adapter sleeve 7. The outer periphery of the opposite end of the cuff 12 to that which carries the flange 13 is provided with a plurality of recesses 16, which are adapted for the reception of a teat wrench, through the medium of which, the nut is threaded on the adapter sleeve. After the nut has been adjusted to the desired position, one or more set screws, such as indicated at 17, may be arranged through the cuff and engaged with the shaft 6 to relieve the stress on the threads of the nut.

End covers 18 are mounted upon the nuts 11. Each cover is equipped with a flange 19, which engages the terminal of the housing and is secured thereto by screws 20 and the like. A portion of each cover projects into the housing to prevent undue outward movement of the bearing 10. The outer end of each cover is provided with a countersunk felt washer 21 to exclude undue moisture, dust, etc., from contact with the bearings. The washers are held in place by clamping rings 22 which are detachably engaged with the end covers.

In the use of this device after the adapter sleeve has been engaged with the shaft 6, the bearings 10, nuts 11, and end covers 18, are assembled as above described. By rotating the nuts 11 it is apparent that the sleeve 7 will be contacted on the shaft 6, and at the same time the bearings 10 will be properly centered. The set screws 17 are then inserted as above described. When it is desired to center or otherwise adjust the bearings 10, it is but necessary to loosen the set screws 17 and then rotate the nuts 11. This relieves the pressure on split sleeve 7, and bearings 10, and the sleeve is then free to move on shaft. In this way the bearings may be very quickly adjusted without the necessity of removing even a single part of the hanger.

The above description covers merely one form of the invention which can be used to produce very satisfactory results. Bearings constructed in accordance with this invention permit the use of large balls which give more than ample load capacity.

A modified form is anticipated in Fig. 5. As therein indicated, the taper at the opposite ends of sleeve 7 is eliminated, together with the taper fit of bearings 10 on the sleeve, it being contemplated that the bearings shall have a tight piston or drawing fit on the sleeve, which is provided with a shoulder 23 inwardly of each bearing seat. The seats are of uniform diameter, rather than tapered as shown in the other figures, and each bearing is confined between a shoulder 23 of the sleeve and an annular flange 13 of an adjusting nut 11, with the inner race of the bearing against the shoulder. The adjusting nuts have the usual piston or sliding fit on the shaft and, when tightened, serve to bolster the bearings from shoulder to shoulder.

It is to be understood that the parts of the present invention may be assembled in other than the manner recited herein, and may be differently constructed to conform to different working conditions. However, the principle of the invention remains intact. Special emphasis is laid upon the peculiar construction of the adapter nuts which make it possible to obtain desired adjustment of the bearings without removing any part of the hanger or support used.

Having thus described my invention, and without enumerating variations and equivalents, what I desire protected by Letters Patent is as set forth in the following claims.

1. A hanger for anti-friction bearings, including a split adapter sleeve for engagement with a shaft, said sleeve being oppositely tapered to points spaced from the ends, the said untapered portions being externally threaded, bearings carried by the tapered portions of the sleeve, a housing, end covers for the housing, and means concealing the ends of the sleeve and adapted to extend through the end covers and engage the screw threads of said sleeve to hold the bearings in a predetermined position upon the sleeve.

2. In combination with a housing and shaft, end covers for the housing, a split adapter sleeve mounted upon the shaft within the housing and tapering to points spaced from the ends thereof, the untapered portions being threaded, bearings movably mounted upon the tapered ends of the sleeve and embracing the inner walls of the housing, means engageable with the threaded ends of said sleeve and abutting the bearings, said means extending through openings in the end covers and beyond the ends of the sleeve.

3. The combination of a split adapter sleeve threaded at each end, a shaft, a housing formed at its extremity with bearing raceways, a ball bearing race within each raceway, cylindrical-shaped end covers formed with radially extending flanges spaced from their inner ends, their outer faces being centrally apertured, nuts movable through the apertures in the end covers and having projections adapted to contact with the bearings, said projections having shoulders to limit the movements of said nuts with respect to the end covers, said nuts also being formed with seats to accommodate and conceal the ends of the said sleeve.

4. As an article of manufacture, a shaft mounting for a pair of bearings comprising a substantially integral sleeve having a bore for fitting a shaft, a tapered portion at each end thereof forming a seat for a bearing having a tapered bore, said sleeve having screw threaded extensions, and one or more longitudinal slots for permitting compressibility.

5. As an article of manufacture, a shaft mounting for a pair of bearings comprising a sleeve, said sleeve being longitudinally slotted for compressibility purposes and adapted to embrace a shaft, a tapered portion at each end of the sleeve forming a seat for a similarly bored bearing, threaded extensions at each end of the sleeve constituting continuations of the bearing seats, and means concealing the ends of the sleeve and adapted to engage the threaded extensions.

6. As an article of manufacture, a shaft mounting for a pair of bearings comprising a substantially integral sleeve, said sleeve being longitudinally slotted for compressibility purposes and adapted to embrace a shaft, a tapered portion at each end of the sleeve forming a seat for a similarly bored bearing, threaded extensions at each end of the sleeve constituting continuations of the bearing seats, a housing, and means concealing the ends of the sleeve and adapted to extend within the housing and engage the threaded extensions.

7. As an article of manufacture, a shaft mounting for a pair of bearings comprising a substantially integral sleeve, said sleeve being longitudinally slotted for compressibility purposes and adapted to embrace a shaft, a tapered portion at each end of the sleeve forming a seat for a similarly bored bearing, threaded extensions at each end of the sleeve constituting continuations of the bearing seats, a housing, end covers for the housing, and means concealing the ends of the sleeve and adapted to extend through the end covers and engage the threaded extensions to maintain the bearings in a predetermined position upon the sleeve.

JOSEPH OSWELL BAILEY.